Sept. 19, 1967  A. E. BARRINGTON ETAL  3,342,990
LEAK DETECTION SYSTEM WHICH UTILIZES A SORPTION PUMP
AND A SPECIFIC MASS SPECTROMETER DETECTOR
Filed May 26, 1964
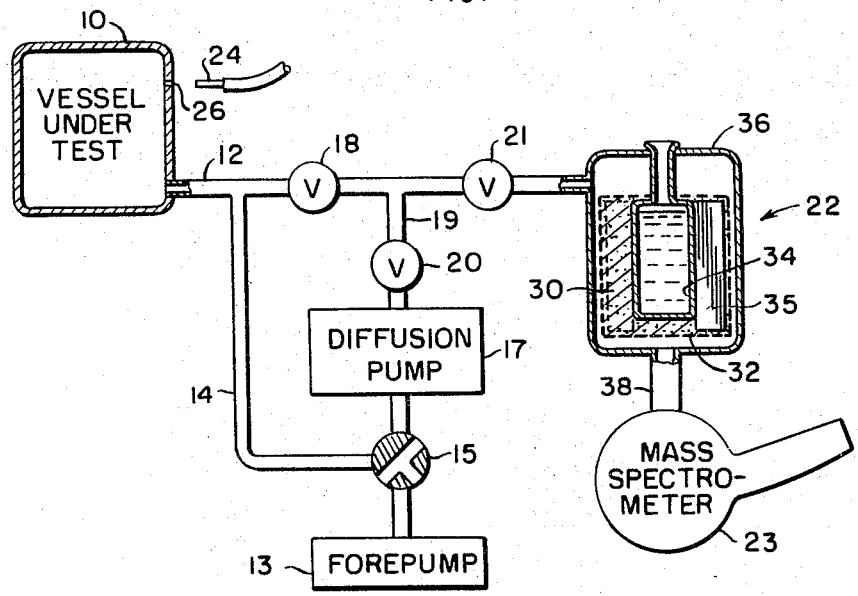
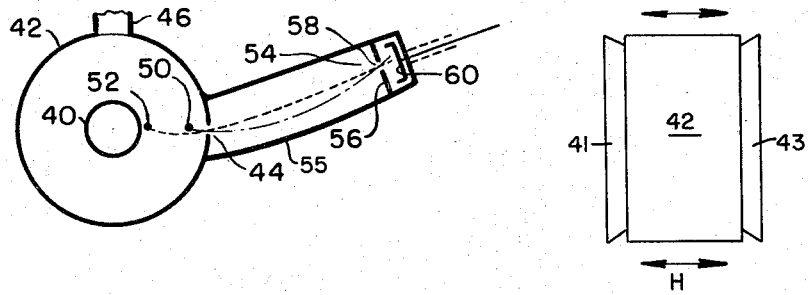
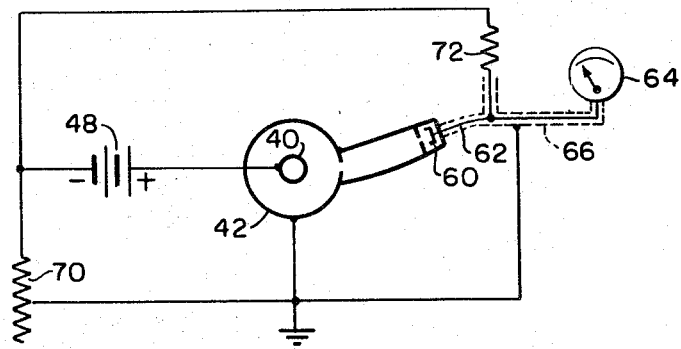
INVENTORS
RICHARD F. HERZOG
ALFRED E. BARRINGTON
WALTER P. POSCHENRIEDER
BY
ATTORNEYS

United States Patent Office

3,342,990
Patented Sept. 19, 1967

---

3,342,990
LEAK DETECTION SYSTEM WHICH UTILIZES A SORPTION PUMP AND A SPECIFIC MASS SPECTROMETER DETECTOR
Alfred E. Barrington, Waltham, Richard F. Herzog, Lexington, and Walter P. Poschenrieder, Burlington, Mass., assignors to GCA Corporation, Bedford, Mass., a corporation of Delaware
Filed May 26, 1964, Ser. No. 370,317
5 Claims. (Cl. 250—41.9)

This invention relates to a leak detection system, and to devices useful in such a system.

Over the years various systems for detecting leaks have been developed. Perhaps the oldest system is one in which a vessel to be tested is first placed under pressure and then submerged in water. A trail of air bubbles in the water will visually signal any leak in the vessel. Such a visual test at best indicates the presence of only relatively large leaks; detecting minute leaks requires a much more sensitive system. In one of the most sensitive leak detection systems now in use, the vessel to be tested is evacuated rather than pressurized. Then, the evacuated vessel is connected to a mass spectrometer and the outer surface of the vessel is scanned by a probe gas, typically helium, to detect leaks. Probe gas molecules will pass into the vessel through any leak, and from the vessel to a mass spectrometer.

In the mass spectrometer the molecules of probe gas are ionized and then sorted from other ionized molecules according to their different masses. The smallest trace of probe gas which can be detected by this system depends upon the total pressure of the gas in which the probe gas is to be detected. The highest sensitivity of the system to probe gas will be achieved for the lowest total gas pressure and the highest relative concentration of probe gas.

The primary object of the present invention is to increase the sensitivity of a leak detection system without a corresponding increase, but rather, a reduction of the cost of the system. These and other objects will appear from the following description of a preferred embodiment of the invention.

The leak detection system of the invention has numerous notable characteristics including:

(a) The relative concentration of probe gas in the mixture of gases supplied to the mass spectrometer is substantially increased over the relative concentration of probe gas in the vessel being tested;

(b) The spectrometer itself is extremely compact as compared to those presently available and a cold cathode is used to simplify structure and operation;

(c) The separation of ions having different masses by the mass spectrometer is, to a large degree, independent of the point of ion formation; and (d) The detection circuitry connected to the mass spectrometer automatically and dynamically compensates for the background current which is normally present.

More particularly, the leak detection system of the present invention includes a sorption pump connected through a throttle valve to an evacuated vessel to be tested for leaks. The sorption pump includes an active element which selectively removes certain gases present within the vessel, normally the gases which collectively constitute air, but not the probe gas. Because of the selective sorption of the gases constituting air, there will be a continuous flow of air from the vessel being tested to the sorption pump. However, the distribution and partial pressure of the probe gas will quickly become uniform throughout the system because there is no pumping action operative on the probe gas. By adjusting the throttle valve to restrict the flow of air from the vessel to the sorption pump, the air pressure downstream of the valve may be substantially decreased. Since the partial pressure of the probe gas quickly becomes uniform throughout the system, the existence of lower air pressure downstream of the valve increases the relative concentration of the probe gas in the gas mixture present downstream of the valve and at the outlet of the sorption pump, to which outlet a mass spectrometer is connected.

The mass spectrometer of the present invention is also evacuated, and includes an anode completely surrounded by a cathode having a slot in one side. A cold cathode serves as a source of electrons. These electrons are produced at the cold cathode by the action of electrical gas discharge. The gas discharge causes secondary electron emission from positive ion bombardment and also photoemission of electrons from the irradiation of the cold cathode by the discharge. Moreover, the electric potential applied between the anode and the cathode causes electrons emitted by the cathode to move toward the anode.

A magnetic field is applied between the anode and cathode parallel to the narrow slot in the cathode, and this field deflects the electrons moving toward the anode, thereby forming an annular cloud of electrons between the anode and cathode. Gas molecules passing through the sorption pump are directed into the space between the anode and cathode of the mass spectrometer, where at least some of them are ionized by the electron cloud. These ions are accelerated towards the cathode by the electric field, and deflected by the magnetic field. Some of the ions will pass through the slot in the cathode. Of these ions, those formed close to the slot are only slightly accelerated and deflected, and will be moving rather slowly as they pass through the slot. Those ions formed closer to the anode are accelerated and deflected a greater amount, and will be moving faster when they pass through the slot in the cathode. There is some fringe magnetic field outside of the cathode. Because of it, the ions which pass through the slot in the cathode are deflected somewhat, the slower ions being deflected a greater amount per unit distance than the faster ones. This converges ions of the same mass, or more accurately of the same mass-to-charge ratio.

An ion collector, which may be a single electrode, is positioned at the zone of convergence, and the ions impinging upon the collector produce an electrical signal. A detector circuit connects the ion collector to an indicating device such as a meter or recorder, and conducts the electrical signal present at the ion collector to the indicating device which is thereby actuated. The detector circuit of the present invention includes two resistances, one resistance connecting the cathode of the mass spectrometer to the negative terminal of the source of electric potential applied between the cathode and the anode, the other resistance connecting the ion collector to the same negative terminal. By proportioning the resistances in a manner determined by the characteristics of the system, the normal background current present at the cathode of the mass spectrometer and at the ion collector may be effectively cancelled from the output of the ion collector. Because of this, the electrical signal which actuates the indicating device is, for all practical purposes, only due to the impingement of the probe gas ions on the collector. This structure including the valve, the sorption pump, the mass spectrometer, and the detector circuit constitutes the complete leak detection system.

The leak detection system will be described in further detail in connection with the accompanying drawings, in which:

FIG. 1 is a plan view of the leak detection system;
FIG. 2 is a view in section of the mass spectrometer;

FIG. 2a is a view in cross-section of a portion of the mass spectrometer of FIG. 2; and FIG. 3 is a schematic view of the detector circuitry connected to the mass spectrometer.

As shown in FIG. 1, a vessel 10 which is to be tested is preferably removably connected to the leak detection system by appropriate structure including a conduit 12. The main components of the leak detection system include a mechanical forepump 13 having an inlet connected to a conventional three-way valve 15. In one position of the valve 15, the inlet of the forepump 13 is connected to the conduit 12 by a line 14. In another position of the valve 15, the inlet of the forepump is connected to the outlet of a conventional diffusion pump 17. The diffusion pump has an inlet connected to the conduit 12 by a line 19 through a main valve 18 and a throttle valve 20. The conduit 12 leads through the main valve 18 and a throttle valve 21 to a sorption pump 22 to the outlet of which is connected a mass spectrometer 23. The preferred construction of the sorption pump and the mass spectrometer will be described below.

In operation, the vessel under test is first evacuated with the forepump 13, with the valve 15 positioned to connect the inlet of the forepump to the test vessel and the main valve 18 and the throttle valves 20 and 21 closed. The throttle valve 20 is then opened, and valve 15 positioned to connect the inlet of the forepump 13 to the outlet of the diffusion pump 17. The main valve 18 is then opened, and the vessel 10 may be evacuated by the forepump 13 and the diffusion pump 17 in series.

The diffusion pump 17 preferably is of a construction capable of maintaining a vacuum of at least $10^{-4}$ torr. Operation may be simplified if the diffusion pump is capable of maintaining a vacuum of $2\times10^{-6}$ torr, as the preferred mass spectrometer of our invention requires such a vacuum for operation. However, the apparatus of our invention makes it possible to attain a vacuum below $2\times10^{-6}$ torr in the mass spectrometer even though the vacuum at the inlet of the diffusion pump is as high as $10^{-4}$ torr. It is desirable that the pumping speed of the diffusion pump should be at least as many liters per second as the volume in liters of the vessel to be evacuated and tested. During operation of the forepump 13 and the diffusion pump 17 in series, the throttle valve 20 is adjusted so that the downstream flow in liters per second is about equal to the volume in liters of the vessel being evacuated and tested, to exchange the gas in the vessel about once a second. A higher flow rate would reduce the gas pressure in the vessel being tested, the partial pressure of the probe gas, and the sensitivity of the system. Similarly, a lower flow rate would increase the transit time required for the probe gas to pass through the system to the mass spectrometer, and increase the response time of the system.

Once the system, including the vessel being tested, has been evacuated by the pumps 13 and 17 and the throttle valve 20 has been adjusted as just described, the throttle valve 21 is opened to permit any gas within the vessel being tested to pass through the connecting conduits to the interior of the sorption pump 22. To test the evacuated vessel for leaks, a nozzle 24 discharging a jet of probe gas such as helium may be passed about the surface of the vessel. A burst of probe gas will enter the vessel through any leak, such as that indicated at 26, as the jet is passed over it.

One function of the sorption pump is to increase the relative concentration of the probe gas in the gas mixture passing through it to the mass spectrometer by selectively passing the probe gas and restricting the passage of other gases. This could be partially accomplished by providing a cold trap to remove condensable materials, such as hydrocarbons and water vapor. However, such a trap will not remove nitrogen and oxygen, the main gaseous constituents of air. Air is, of course, the principal component along with the probe gas in the gas mixture flowing through the sorption pump. A titanium getter trap would sorb the gaseous constituents of air, but such a trap becomes saturated rather quickly unless new layers of titanium are continuously evaporated and condensed on the active surface. However, during the evaporation process, trapped gases are suddenly released by the titanium trap and may easily be misinterpreted as a leak in the vessel.

To avoid such problems, a molecular sieve material 30 such as Linde Zeolite is used as the active element of the sorption pump of the invention. The sieve material 30 is first heated and simultaneously evacuated to rid it of all previously absorbed gases, and then cooled to a low temperature, as with liquid nitrogen. This conditioning process is normally performed before the vessel to be tested is evacuated. It then sorbs all gases except helium, neon and hydrogen, and, as long as it is held at a constant low temperature, it will not release these sorbed gases. The mass of molecular sieve material within the sorption pump is held in place by a screen 32 around a bottle 34 and spaced from the ends of a housing 36, which should be well insulated, as by restricting the diameter of the screen 32, as shown. A series of radial metal vanes such as the vane 35 may be secured to the bottle 34, dividing the space filled with sieve material into components and serving to promote heat transfer from the sieve material to liquid nitrogen in the bottle 34. The neck of the bottle 34 extends through the top end of the housing 36, and receives liquid nitrogen or the like to cool the molecular sieve material to a very low temperature. Because the level of liquid nitrogen in the bottle 34 will normally change somewhat due to evaporation of nitrogen or addition of more nitrogen, it is preferred to construct the sorption pump with an inlet conduit at the top portion of the housing 36, and an outlet conduit 38 at the bottom portion of the housing. By this arrangement, while the temperature of the molecular sieve material adjacent the top of the bottle will change somewhat with the level of the liquid nitrogen in the bottle, and release some of the sorbed gases, as is its nature, the molecular sieve material adjacent the bottom of the bottle will remain at a constant low temperature regardless of changes in the level of the liquid nitrogen in the bottle, and will not release sorbed gases to contaminate the gas mixture present at the outlet of the sorption pump.

Gas molecules in the vessel being tested pass through the conduits from the vessel to the inlet of the sorption pump, and encounter the molecular sieve material 30. This molecular sieve material will permit the probe gas to pass through it without absorption, but will sorb the other heavier gaseous molecules of air which are normally present. This sorption exerts a pumping action on the gases being sorbed, and there will be a continuous flow of the gases being sorbed from the vessel being tested through the connecting conduits to the sorption pump. Because of the sorption process, at the outlet conduit 38 of the sorption pump there will be present a gas mixture having a much higher relative concentration of probe gas than the gas mixture at the inlet of the sorption pump. In other words, the molecular sieve material of the sorption pump, by selectively passing the probe gas, substantially increases the relative concentration of probe gas in the gas mixture present at outlet 38.

Not only does the sorption pump itself increase the concentration of the probe gas in the gas mixture supplied to the mass spectrometer, but also it cooperates with the throttle valve 21 to further increase the concentration of probe gas in the gas mixture present at the inlet of the sorption pump.

The throttle valve 21 is only used for throttling purposes when the pressure in the conduit 12 cannot be reduced to a sufficiently low level to permit a pressure of $2\times10^{-6}$ torr to be attained at the outlet 38 of the sorption pump 22; that is, if the diffusion pump 17 and forepump 13 in series are capable only of producing a vacuum between $10^{-4}$ and $2\times10^{-6}$ torr. The pumping speed of the diffusion pump 17 is, roughly, inversely proportional to the square root of the molecular weight of the gases being pumped under the conditions of molecular flow prevailing at the pressures in question. Thus, helium is pumped 2.7 times faster than air. Therefore, the diffusion pump will reduce the relative helium concentration and the sensitivity of the system for leak detection. The Zeolite sorption pump 22, on the other hand, does not pump helium and the partial pressure of helium will be the same on both sides of the valve 21. However, if the valve is partially closed, its flow resistance in cooperation with the pumping action of the sorption pump 22 will greatly reduce the partial pressure of the main gas constituents, nitrogen, oxygen and water vapor, on the sorption pump side of the valve 21. Thus, partially closing the valve 21 will increase the relative helium concentration, thereby increasing the sensitivity for leak detection, while at the same time greatly reducing the total pressure in the sorption pump and in the mass spectrometer. The latter action is important, not only because the mass spectrometer of our invention works best at a vacuum of $2 \times 10^{-6}$ torr or less, but to prevent loading of the molecular sieve material 30 beyond its capacity to maintain the desired low pressure.

The adjustment of the throttle valve 21 is rather critical. If the valve is opened too much, the partial air pressure differential it produces will be small, and the gain in the relative concentration of probe gas and in the sensitivity of the system will be small. If the valve is almost closed, the gain in relative concentration and sensitivity will be large, but the length of time the system will require to respond to a burst of probe gas through a leak also will be large, for it will take longer for a given amount of probe gas to pass through the smaller opening. A long response time for the system is inconvenient for normal leak detection, for it requires that the jet of probe gas be moved very slowly about the vessel being tested. For these reasons, the adjustment of the throttle valve reflects a compromise between sensitivity and response time. A response time of about one second is preferred, for at this adjustment the system gives both reasonably fast detection of leaks and good sensitivity.

The throttle valve performs another important function. It may be closed to isolate the sorption pump and mass spectrometer when the test vessels are being changed. Because these units are not opened to the atmosphere when a change is so made, they need not be repeatedly outgassed and reconditioned, which speeds up the testing procedure.

There will be present at the outlet 38 of the sorption pump a gas mixture at a total pressure of approximately $10^{-6}$ torr in which the relative concentration of the probe gas has been increased about two orders of magnitude by the combined effect of the upstream structure.

The device used to sense the presence of helium as a probe gas in the gas mixture at the outlet of the sorption pump could be any of various types of instruments, even a vacuum gauge. It is preferred to employ a mass spectrometer of the illustrated construction, though, for it has a small volume, is quite simple, reliable, and inexpensive to build, and has an adequate resolution for helium. It does have a considerable background current, but by employing the structure previously described and the detector circuitry described below, the background current can be reduced sufficiently to achieve a leak detection system of high sensitivity at a reasonable cost.

The mass spectrometer is illustrated in cross section in FIG. 2, and the detector circuitry connected to the mass spectrometer is schematically illustrated in FIG. 3. The mass spectrometer includes an anode 40 completely surrounded by a cathode 42. While the anode and cathode are illustrated as being formed into two concentric cylinders, the former solid, the latter hollow and enclosing the former, it will be understood by those skilled in the art that any other shape will suffice, so long as the cathode completely surrounds the anode. The space within the cathode is evacuated. Also, the cathode has a narrow longitudinal slot 44 formed in one side. An inlet conduit 46 is provided in the cathode 42. The gas mixture present at the outlet conduit 38 of the sorption pump is conducted through this inlet 46 of the mass spectrometer to the space between the anode and the cathode. A source of electric potential 48 is connected between the anode and the cathode, the anode being positive with respect to the cathode. The strength of this electric potential, which may be in the range of from 500 to 2000 volts, and the material of the cathode are chosen so that electrons are emitted from the surface of the cathode as what is known as a cold cathode discharge and flow towards the anode 40, being accelerated during this transit by the applied electric field.

A strong magnetic field—in the range of 1000 gauss—is applied by an appropriate source such as the pole pieces 41 and 43 shown in FIG. 2a between the anode 40 and the cathode 42, the lines of magnetic force being perpendicular to the plane of the drawing. This magnetic force deflects the electrons flowing from the cathode 42 towards anode 40 into cycloidal or circular paths around the anode 40, producing an annular cloud of electrons between the anode and cathode.

An appreciable number of the gas molecules passing through inlet 46 will interact with and be ionized by this electron cloud, the ionized gas molecules then being accelerated by the electric field in a radial direction towards the cathode. Some of these ions will pass through the slot 44 in the cathode. Of the ions passing through the slot, those formed close to the slot, such as at point 50, will be accelerated only slightly by the electric field and will be moving rather slowly, while those formed at a point closer to the anode, such as at point 52 will be accelerated a much greater amount by the electric field and will be moving much faster when they pass through the slot.

The magnetic field, although mainly concentrated within the cathode, exists nevertheless as a weak, fringe field outside of the cathode. This fringe field continues to deflect the ions that have passed through slot 44, the slower moving ions being deflected a greater amount than the faster moving ones. Thus the ions of a particular mass-to-charge ratio will converge at a zone 54, whether the ions have been formed at point 50 or at point 52, or at some location between these points. By proper choice of the magnetic and electric fields, the convergence of the ions of the same mass-to-charge ratio at zone 54 is relatively independent of the location where the ions were formed. For this reason, the location at which an ion is formed is not nearly as critical in the present mass spectrometer as in mass spectrometers of the prior art, which is an important advantage.

A plate 56 having an aperture 58 is mounted in a housing 55 extending from said cathode and in the path of the ions with the aperture at the zone 54, and upon it impinge the ions of the background gas which do not converge at the zone 54. Behind the plate 56 is an ion collector electrode 60 upon which impinge the ions of the probe gas passing through the zone 54.

As will be readily understood by those skilled in this art, the deflection of any ion is a function of its mass-to-charge ratio, as well as of the applied electric and magnetic fields. The mass spectrum of the gas mixture may be scanned by mechanical movement of the slot 44 in the cathode, or of plate 56 and aperture 58, or by varying the electric and magnetic fields. Similarly, by a proper adjustment of these factors, ions of the probe gas may be converged on the ion collector electrode.

The ion collector electrode 60 is connected by a conductor 62, preferably the inner conductor of a coaxial conductor cable, to an indicator such as an electrometer 64, a recorder or the like. Ions impinging upon the collector 60 will produce an electrical signal in the conductor 62 which signal actuates meter 64. More specifically, the ions impinging on the collector electrode result in a potential on the collector electrode which is positive with respect to the cathode, and current will flow to the electrode through the inner conductor 62, meter 64, and the outer shielding conductor 66 of the coaxial cable, which shielding conductor is connected to the cathode. The meter visually indicates the strength of the electrical signal and the relative quantity of ions collected, thereby indicating the presence of probe gas in the system and a leak in the vessel being tested.

The potential existing between the cathode and the collector electrode, and the electrical signal which actuates the meter 64, would normally be due to two factors: (1) the probe gas ions, which are essentially proportional to the probe gas partial pressure in the gas mixture fed to the mass spectrometer; and (2) a small fraction of other scattered ionized gas molecules, which are essentially proportional to the total pressure of the gas mixture, and to the total discharge current and background current. Improved sensitivity of the system to the probe gas is obtained if the background current is subtracted from the total collector current, and only the resultant electrical signal supplied to the indicating device. To this end, two resistances are provided in the detector circuitry, one resistance 70 connecting the negative terminal of the source of electric potential 48 to the cathode 42, the other resistance 72 connecting the same negative terminal to the inner conductor 62. By this arrangement, the voltage drop across resistance 70 is proportional to the cathode current, and that across resistance 72 is proportional to the collector current. If no probe gas is present, the collector current is only composed of the background current. The resistances are proportioned, which may be readily accomplished by providing an adjustable resistance, so that when no probe gas is present the voltage existing across them due to the cathode or collector current are equal. Accordingly, the voltage rise from the negative terminal of the source of electric potential 48 across resistance 70 to the outer conductor 66 and one terminal of the indicating device is equal to the voltage rise from the negative terminal across resistance 72 to the inner conductor 62 and the other terminal of the indicating device. Since in this condition the terminals of the indicating device are both at the same potential, no indication will occur. If, however, probe gas enters the system, the cathode current will remain practically unchanged and only the collector current will be increased by the probe gas. This increase offsets the balance of voltage drops across resistances 70 and 72 producing an increased voltage drop across resistance 72 which results in a net voltage across the terminals of the indicating device, thereby actuating it. While a small fraction of the collector current will be lost through the resistance 72, this loss can be neglected if the resistance 72 is about ten times larger than the effective input impedance of the indicating means. It is advantageous to employ an indicating means which has a negative feedback loop of high gain, because the effective input impedance of such an instrument is much smaller; it is equal to the input resistance divided by the voltage gain of the feedback loop. This results in faster response and better stability of the system. Preferably, the outer shielding conductor 66 of the coaxial conductor cable containing conductor 62 is connected to cathode 42 and the cathode 42 is grounded to shield the device from external fields.

The several components of the leak detection system of our invention having been described, the operation of the system will next be considered. First, the Zeolite in the sorption pump 22 is activated. For this purpose, the main valve 18 is closed, the throttle valves 20 and 21 are opened, and the outlet of the diffusion pump 17 is connected to the inlet of the forepump 13 by means of the valve 15. The Zeolite is heated during the pumping process in a conventional manner. When the activation process is completed, the throttle valve 21 is closed, and the bottle 34 is filled with liquid nitrogen. The vessel 10 is then roughed out with the forepump 13, the valve 15 being positioned to connect the forepump to the vessel 10 over the bypass line 14, and the main valve 18 remaining closed. Next, the diffusion pump 17 is connected in series with the forepump by means of the valve 15, the throttle valve 20 and the main valve 18 are opened, and the vessel is pumped down to at least $10^{-4}$ torr, and preferably to at least $2 \times 10^{-6}$ torr. The vessel 10 is then in condition to test for leaks. If the pressure has been reduced to at least $2 \times 10^{-6}$ torr, the throttle valve 21 is fully opened. The valve 20 is throttled, so that the sorption pump 22 does most or even all of the pumping. A jet of probe gas is now passed around the vessel. When the probe is in the vicinity of a leak, a burst of helium will enter the vessel and mix with the residual gases, together with air entering through all such leaks as may exist in the vessel. Assuming the valve 20 to be throttled and the valve 21 to be fully opened, the action of the sorption pump in selectively removing gases other than helium will greatly increase the relative concentration of helium passing into the mass spectrometer, and the sensitivity of the system is at its maximum. In the mass spectrometer, the gas is ionized, and the probe gas ions converge on the collector electrode 60. This results in an electrical signal, which is applied to actuate the indicating means, thereby signalling the presence of probe gas in the system and a leak in the vessel.

If the diffusion pump is unable to reduce the pressure in the test vessel to $2 \times 10^{-6}$ torr, the test is conducted with the valve 20 opened wider and the throttle valve 21 partially closed to present resistance to flow and permit the sorption pump to reduce the pressure in the mass spectrometer below the pressure at the inlet of the diffusion pump. While the sensitivity of the system is reduced, owing to the removal of probe gas by the diffusion pump, the mass spectrometer is still operated at the optimum pressure and the sorption pump still functions to increase the relative concentration of helium flowing to the spectrometer.

Although the system and structure which has been described constitutes the preferred embodiment of the invention, it is only illustrative of the invention as it may be practiced successfully. Given the foregoing disclosure as a guide, those skilled in this art will readily recognize various feasible modifications which may be made without departing from the spirit or scope of the invention.

What is claimed is:

1. In a system for detecting leaks in an evacuated vessel having its exterior surface exposed to atmospheric air and a scanning probe gas of low mass relative to air, said vessel being connected to a sorption pump having sorbent material for selectively blocking the passage of air and permitting the passage of said probe gas, the combination of a mass spectrometer connected to said sorption pump, said mass spectrometer comprising an anode, a cathode surrounding said anode but having at least an aperture formed therein at a point radially displaced from said anode, a housing extending generally radially from said cathode and surrounding said aperture, means for directing the output of said sorption pump into the space between said anode and said cathode, means for producing an electric field between said anode and said cathode to render said anode positive with respect to said cathode, means for producing a magnetic field substantially concentrated between said anode and said cathode and at right angle to said electric field, whereby electrons emitted from said cathode form a cloud between said anode and said cathode, gas molecules between said anode and said cathode being formed into ions, ions of said probe gas being accelerated through said aperture by said electric field and deflected by said magnetic field to converge at a discrete zone within said housing, an ion collector electrode disposed at said discrete zone whereby said ions of said probe gas impinge upon said ion collector electrode to produce an electrical signal proportional in magnitude to the quantity of converged ions, and indicating means connected to said collector electrode for displaying the magnitude of said signal.

2. In a system as defined in claim 1, the combination which includes a first resistance connected between the negative terminal of said means for producing an electric field and said ion collector and a second resistance connected between said cathode and said negative terminal, said resistances being so proportioned that the voltage drops across them are substantially equal when the system is substantially free of probe gas, said indicating means being connected between said ion collector electrode and said cathode.

3. In a system as defined in claim 2, the combination in which one of said resistances is adjustable whereby the voltage drop across said first resistance may be made equal to the voltage drop across said second resistance when said system is substantially free of said probe gas.

4. In a system as defined in claim 1, the combination in which said means for producing an electric field comprises a source of direct electric potential connected between said anode and said cathode to maintain said anode positive with respect to said cathode and said means for producing a magnetic field comprises a source of unidirectional magnetism whose lines of force are concentrated within the space between said anode and said cathode perpendicular to said electric field, said aperture in said cathode comprising a slot for the passage of ions into said housing, said discrete zone being disposed external to said cathode and within said housing.

5. In a system as defined in claim 1, the combination in which said cathode and said anode comprise concentric cylinders, said aperture formed in said cathode is elongated in alignment with said magnetic field and said magnetic field includes a fringe field in an adjacent said housing extending outside said cathode.

References Cited

UNITED STATES PATENTS

| | | | |
|---|---|---|---|
| 2,504,530 | 4/1950 | Jacobs | 73—40.7 |
| 2,636,990 | 4/1953 | Gow et al. | 250—41.9 |
| 2,863,315 | 12/1958 | Penning | 73—40.7 |
| 3,227,872 | 1/1966 | Nemeth | 250—41.9 |

FOREIGN PATENTS

| | | |
|---|---|---|
| 722,788 | 1/1952 | Great Britain. |

ARCHIE R. BORCHELT, *Primary Examiner.*

RALPH G. NILSON, *Examiner.*

W. F. LINDQUIST, *Assistant Examiner.*